| United States Patent [19] | [11] Patent Number: 4,880,666 |
| Ito et al. | [45] Date of Patent: Nov. 14, 1989 |

[54] METHOD OF MANUFACTURING MAGNETIC RECORDING MEDIUM

[75] Inventors: Takeo Ito; Hajime Takeuchi, both of Yokohama; Minoru Hashimoto, Kawasaki; Toshio Fukaya, Yokohama; Masumi Koishi, Sagamihara, all of Japan

[73] Assignee: Kabushiki Kaisha Toshiba, Kawasaki, Japan

[21] Appl. No.: 136,436

[22] Filed: Dec. 17, 1987

Related U.S. Application Data

[63] Continuation of Ser. No. 660,371, Oct. 12, 1984, abandoned.

[30] Foreign Application Priority Data

Dec. 27, 1983 [JP] Japan ................................ 58-249866

[51] Int. Cl.$^4$ ............................................. H01F 10/02
[52] U.S. Cl. .................................... 427/128; 264/109; 427/127; 428/694; 428/900
[58] Field of Search ................................ 427/127–132, 427/48; 428/694, 900; 264/109

[56] References Cited

U.S. PATENT DOCUMENTS

| 2,959,153 | 11/1960 | Hider .................................. 118/637 |
| 3,486,937 | 12/1969 | Linares ............................... 117/236 |
| 3,645,770 | 2/1972 | Flint .................................. 430/106.6 |
| 4,229,312 | 10/1980 | Nagashiro et al. ............... 252/62.54 |
| 4,415,630 | 11/1983 | Kubota et al. ...................... 427/403 |

OTHER PUBLICATIONS

Soviet Inventions Illustrated, Derwent Publications Ltd., Week E27, Abstract No. 862/212 (9/17/82).

*Primary Examiner*—Bernard Pianalto
*Attorney, Agent, or Firm*—Oblon, Spivak, McClelland, Maier & Neustadt

[57] ABSTRACT

A method of manufacturing a magnetic recording medium has a step of mechanically pulverizing and mixing a composition of a binder consisting of a solid resin and a magnetic powder so as to form a mixed powder. The method allows mass-production of magnetic recording media having excellent outputs and S/N ratios.

5 Claims, No Drawings

METHOD OF MANUFACTURING MAGNETIC RECORDING MEDIUM

This application is a continuation of application Ser. No. 06/660,371 filed on Oct. 12, 1984, now abandoned.

BACKGROUND OF THE INVENTION

The present invention relates to a method of manufacturing a magnetic recording medium and, more particularly, to a method of manufacturing a magnetic recording medium in which the step of dispersing a magnetic powder in a binder is improved.

A magnetic recording medium is conventionally manufactured by the following method. First, a needle-like γ-ferrite powder or a Co-coated γ-ferrite powder is dissolved in a solvent or mixed with a binder resin to prepare a magnetic paint. The magnetic paint is then applied on the surface of a base material such as a polyester film and dried to prepare a magnetic recording medium.

Demand for high-density in magnetic recording media is strong. In order to satisfy this, various methods have been proposed including a method of reducing the size of γ-ferrite particles and a method of using a reducing powder (metal powder). The most important factor in the manufacture of a high-density magnetic recording medium is the dispersion of such an ultrafine powder in a binder resin. In view of this, great effort has been made to achieve satisfactory dispersion. Various techniques have been proposed including an improvement in the surface properties of a magnetic powder, various dispersion mixers, and dispersion processes, and new dispersants or binder resins. Among these dispersion techniques, the wet dispersion method has been generally adopted. According to this method, a magnetic powder together with a dispersant or a binder resin is dispersed in water or in an organic solvent by a dispersion mixer such as a dissolver, a kneader, a ball mill, a sand grinder, or a paint shaker. This method is generally adopted because magnetic powders such as needle-like γ-ferrite powders or metal powders are less resistant to mechanical stress and crack easily. Also, metal powders are easily oxidized and, when dry, may catch fire or explode. Such powders must be treated in a wet state. Conventional magnetic powder dispersion methods require complex and cumbersome procedures and means, resulting in low productivity.

SUMMARY OF THE INVENTION

It is an object of the present invention to provide a method of manufacturing a magnetic recording medium which allows uniform dispersion of magnetic powder particles in a binder with a simple operation and allows mass-proudction of a magnetic recording medium with excellent characteristics.

According to the present invention, there is provided a method of manufacturing a magnetic recording medium, which comprises the step of mechanically pulverizing and mixing a composition containing a binder consisting of a solid resin and a magnetic powder.

The magnetic powder preferably used in the present invention is a hexagonal ferrite powder containing a substituting element, and is stable against mechanical stress.

DETAILED DESCRIPTION OF THE PREFERRED EMBODIMENT

The hexagonal ferrite containing a substituting element as the magnetic powder to be used herein is a hexagonal ferrite having a general formula $MO.n(Fe_2O_3)$ wherein M is one of Ba, Sr, Pb, and Ca; n is a number between 5 and 6, and part of the Fe may be substituted with Ti, Co, Zn, In, Mn, Cu, Ge, or Nb. Fine particles of such a hexagonal ferrite are regular hexagonal single crystals having a size normally represented by the length of diagonals of a regular hexagonal plate. The thickness of the hexagonal plate is about ½ to 1/10 of the diagonals, and the axis of easy magnetization is perpendicular to the surface of the plate. In order to achieve high dispersion, a magnetic powder which will not easily be sintered or agglomerate upon drying is preferably used. Sintering of a magnetic powder largely depends upon the manufacturing method thereof. However, since a magnetic powder manufactured by the glass crystallizing method is not substantially sintered, it can therefore by suitably used in the method of the present invention. The agglomerating force of the magnetic powder can be weakened by a surface treatment of the magnetic powder. The surface treatment for this purpose may include a treatment with a coupling agent such as a Ti-coupling agent, a Si-coupling agent, an Al-coupling agent, or a Zr-coupling agent, or a colloidal agent; a plasma treatment; a surfactant treatment; and the like. However, these treatments are enumerated only for the purpose of explanation and can be replaced with any other treatment agent. A magnetic powder subjected to a selected surface treatment is securely bound with a binder resin, and therefore has excellent mechanical properties such as wear resistance. In addition to this, a surface-treated magnetic powder can maintain its stable dispersability even in a magnetic paint. Therefore, when the magnetic powder is used for a magnetic tape or a disc magnetic recording medium, excellent electromagnetic properties can be obtained.

The binder resin to be used herein must be solid during dispersion. Therefore, a binder resin which is solid at room temperature is preferable. However, if a binder resin is solid during dispersion, it can be used even if it is liquid at room temperature. Although the binder resin can be in the forms of pellets or lumps, it is preferably in a powder form in order to improve dispersion efficiency. Examples of such a binder resin may include a vinyl chloride copolymer such as a vinyl chloride-vinyl acetate-vinyl alcohol copolymer, a vinyl chloride-vinyl acetate-maleic anhydride copolymer, a vinyl-chloride-acryl copolymer, or a vinyl chloride-acryl-maleic anhydride copolymer; a thermoplastic resin such as vinylidene chloride, polyvinyl alcohol, polyvinyl formal, polyvinyl butyral, polyvinyl acetal, polyester, polyurethane, polyacrylate, polycarbonate, polyether, polyacrylate, polyvinyl pyrrolidone, poly-p-vinyl phenol, polyacrylonitrile, polyamide resin, cellulose resin, or a phenoxy resin; or a thermosetting resin such as an epoxy resin, unsaturated polyester, phenolic resin, melamine resin, urea resin, furan resin, xylene resin, or ketone resin. Such a binder resin can be used singly or in a mixture.

The mixing ratio of the magnetic powder and the binder resin is preferably 2 to 200 parts by weight based on 100 parts by weight of the magnetic powder. This is attributed to the following reason. When the amount of the binder resin is less than 2 parts by weight, the dispersibility of the magnetic powder is degraded, and stability during dilution in a solvent or magnetic orientation is lowered. However, if the amount of the binder resin exceeds 200 parts by weight, the required magnetic characteristics for a magnetic recording medium cannot be obtained.

The pulverization and mixing, i.e., the dry dispersion of the magnetic powder and the binder resin can be performed with equipment such as a mixer, a Henschel mixer, an atomizer, or a coffee mill. When the magnetic powder and the binder resin are dry-dispersed with such a dispersion mixer, the dispersion conditions are determined in accordance with the performance of the equipment used and the melting point of the binder resin. However, the dispersion time preferably falls within a range between 1 to 60 minutes and the dispersion temperature preferably falls within a range between room temperature and 150° C.

Prior to dry dispersion, various additives may be added to the composition to be dispersed together with the magnetic powder and the binder resin. Examples of such additives may include an antistatic agent such as carbon or graphite; an abrasive such as chromium oxide or alumina; an inorganic powder such as calcium carbonate, magnesium oxide or silica; a lubricant such as an aliphatic acid, an aliphatic ester, an aliphatic amide, silicone oil, or a fluorocarbon; a surfactant; a stabilizer; a mold releasing agent; a pigment; a dye; an aging preventing agent; a surface treatment agent; or a plasticizer. The additive is generally added in an amount below 50 parts by weight based on 100 parts by weight of the binder resin. Another additive different from that described above can also be added if it is added in an amount of about 0.01 to 10 parts by weight.

According to the method of the present invention, the magnetic powder and a solid binder resin are mechanically pulverized and mixed so as to prepare a mixed powder wherein magnetic powder is uniformly applied with the resin by friction heat with a simple, and short treatment. The thus obtained magnetic mixture can be directly formed into a plastic magnet or a hard disc. When the magnetic mixture is used for a magnetic recording medium such as a magnetic tape or a floppy disc, the magnetic mixture is diluted in a solvent or a resin to a desired concentration or viscosity to prepare a magnetic paint. The magnetic paint is then applied on a nonmagnetic support such as a polyester film and is dried. The dilution operation can be performed with a dispersion mixer such as a ball mill, a sand mill, a kneader, a three-roll mixer, a colloid mill, a paint shaker, a homogenizer, and a dissolver.

The present invention will now be described by way of its examples.

EXAMPLE 1

Two kilograms of a substituted barium ferrite powder (Ms: 59 emu/g, Hc: 780 Oe) having a chemical formula $Ba.6 \ (Fe_{0.86}Co_{0.07}Ti_{0.07})_2O_3$ were charged into a Henschel mixer together with 100 g of a conductive carbon black, 50 g of alumina and 200 g of a vinyl chloride-vinyl acetate copolymer (UCC; "VAGH"). While the components were cooled, they were dry-dispersed for 20 minutes to prepare a magnetic mixture. When the magnetic mixture was observed with a scanning electron microscope ($\times 800$), the resin, the barium ferrite powder, carbon and alumina were homogeneously mixed.

Subsequently, 2 kg of a solvent mixture (mixing ratio 1:1) of methyl ethyl ketone and toluene and 200 g (100% solid content) of a polyurethane resin (Nippon Polyurethane; "N2301") were added, and the components were dispersed with a sand grind mill for 2 hours. After the mixture was filtered, a polyisocyanate curing agent (Nippon Polyurethane; "Colonate L") was added in the amount of 30% by weight based on the resin content to prepare a magnetic paint. The magnetic paint was applied on a polyester film to form a magnetic film having a thickness of 3 $\mu$m. The film was passed through a supercalender to provide a magnetic recording medium having a surface roughness of less than 0.4 $\mu$m.

The obtained magnetic recording medium had a glossiness (60°-60°) of 161.

EXAMPLE 2

Ten parts by weight of a vinyl chloride-vinyl acetate copolymer (UCC; "VMCH") were added to 100 parts by weight of the same substituted barium ferrite powder (Ms: 59 emu/g, Hc: 780 Oe) as in Example 1, and the mixture was dry-dispersed in a mixer for 3 minutes to prepare a magnetic mixture.

A paint conditioner was used for dispersion for two hours of 110.0 parts by weight of the magnetic mixture, 1.5 parts by weight of oleic acid, 3.0 parts by weight of chromium oxide, 2.0 parts by weight of palmitic acid, 60.0 parts by weight of a 20 wt.% solution of a polyurethane resin (Nippon Urethane; "N-2301"), 70.0 parts by weight of methyl ethyl ketone, and 60.0 parts by weight of toluene. The dispersed material obtained was filtered, and a polyisocyanate curing agent (Nippon Urethane; "Colonate L") was added to the material in the amount of 20% by weight based on the weight of the resin content to prepare a magnetic paint. The magnetic paint was applied on a polyester film with an applicator to prepare a magnetic film about 3.5 $\mu$m thick. The film was then passed through a supercalender to polish the surface and was then cut into a width of ½ inch to provide a magnetic tape.

When the electromagnetic conversion characteristics of the obtained magnetic tape were measured (3.75 m/sec, 4 MHz carrier), the output was 210 $\mu$V and the S/N ratio was 34.6 dB.

COMPARATIVE EXAMPLE 1

A magnetic paint of the same composition as that of Example 2 was prepared by wet dispersion. A magnetic tape was prepared using the obtained magnetic paint following the same procedures as in Example 2.

The electromagnetic conversion characteristics of the resultant magnetic tape were measured by the same method as in Example 2. The output was measured to be 175 $\mu$V, and the S/N ratio was measured to be 33.4 dB.

EXAMPLES 3-6

Four magnetic mixtures were prepared. The first magnetic mixture contained 100 parts by weight of the same barium ferrite as that used in Example 2, and 10 parts by weight of a vinyl chloride-vinyl acetate copolymer (UCC; "VAGH") (Example 3). The second magnetic mixture contained 101 parts by weight of the same barium ferrite powder coated with 1% of a Ti-coupling agent (Ajinomoto; "138S") and 10 parts by weight of the same copolymer (Example 4). The third magnetic mixture contained 101 parts by weight of the same barium ferrite powder coated with 1% of a Ti-coupling agent (Ajinomoto; "TTS") and 10 parts by weight of the same copolymer (Example 5). The fourth magnetic mixture contained 101 parts by weight of the same barium ferrite coated with 1% of a silane-coupling agent (UCC; "A-187"), and 10 parts by weight of the same copolymer (Example 6). The magnetic mixtures were subjected to the same dry dispersion treatment as in Example 2. The magnetic mixtures were dispersed together with the additives and solvents shown in Table below with a paint conditioner to prepare magnetic paints. These magnetic paints were used to prepare magnetic tapes manufactured by the same method as in Example 2.

COMPARATIVE EXAMPLES 2-5

Four magnetic paints were prepared by performing a wet dispersion treatment of the same barium ferrite powder as that used in Examples 3 to 6 together with the additives and solvents shown in the Table below. These magnetic paints were used to prepare the magnetic tapes according to the method of Example 2.

The electromagnetic conversion characteristics of the magnetic tapes of Examples 3 to 6 and Comparative Examples 2 to 5 were evaluated, and the results obtained are shown in the Table below.

TABLE

|  |  | Example 3 | Comparative Example 2 | Example 4 | Comparative Example 3 |
|---|---|---|---|---|---|
| Dry dispersion | | Performed | Not performed | Performed | Not performed |
| Surface treatment | | Untreated | Untreated | Treated with Ti-coupling agent | Treated with Ti-coupling agent |
| Content (parts by weight) | Magnetic substance | 100 (+) | 100 | 101 (+) | 101 |
|  | Binder resin | 10 | 10 | 10 | 10 |
|  | $Cr_2O_3$ | 2.5 | 2.5 | 2.5 | 2.5 |
|  | Oleic acid | 2.0 | 2.0 | 2.0 | 2.0 |
|  | Butyl palmitat | 2.0 | 2.0 | 2.0 | 2.0 |
|  | Polyurethane resin | 5.0 | 5.0 | 5.0 | 5.0 |
|  | Methyl ethyl ketone | 70.0 | 70.0 | 70.0 | 70.0 |
|  | Toluene | 60.0 | 60.0 | 60.0 | 60.0 |
| Output (3.5 m/4 MHz) | | 185 μV | 165 μV | 210 μV | 180 μV |
| S/N ratio (3.5 m/4 MHz) | | 34.8 dB | 33.1 dB | 35.7 dB | 34.5 dB |

|  |  | Example 5 | Comparative Example 4 | Example 6 | Comparative Example 5 |
|---|---|---|---|---|---|
| Dry dispersion | | Performed | Not performed | Performed | Not performed |
| Surface treatment | | Treated with Ti-coupling agent | Treated with Ti-coupling agent | Treated with silane-coupling agent | Treated with silane-coupling agent |
| Content (parts by weight | Magnetic substance | 101 (+) | 101 | 101 (+) | 101 |
|  | Binder resin | 10 | 10 | 10 | 10 |
|  | $Cr_2O_3$ | 2.5 | 2.5 | 2.5 | 2.5 |
|  | Oleic acid | 2.0 | 2.0 | 2.0 | 2.0 |
|  | Butyl palmitate | 2.0 | 2.0 | 2.0 | 2.0 |
|  | Polyurethane resin | 5.0 | 5.0 | 5.0 | 5.0 |
|  | Methyl ethyl ketone | 70.0 | 70.0 | 70.0 | 70.0 |
|  | Toluene | 60.0 | 60.0 | 60.0 | 60.0 |
| Output (3.5 m/4 MHz) | | 205 μV | 180 μV | 175 μV | 155 μV |
| S/N ratio (3.5 m/4 MHz) | | 35.5 dB | 34.2 dB | 34.8 dB | 33.5 dB |

It can be seen from the above Table that the magnetic tapes of Examples 3 to 6 have better outputs and S/N ratios than the magnetic tapes of Comparative Examples 2 to 5. It can also be seen that the magnetic tapes of Examples 4 and 5 using the barium ferrite powder treated with a Ti-coupling agent have better outputs and S/N ratios than those of the magnetic tape of Example 3 which used a barium ferrite compound which did not use a coupling agent.

As described above, according to the present invention, a magnetic mixture in which a magnetic powder and a binder resin are homogeneously mixed can be prepared in a simple operation. When the magnetic mixture obtained with the method of the present invention is used as a starting material for manufacturing a magnetic recording medium, a magnetic recording medium having an excellent S/N ratio can be mass-produced.

We claim:

1. A method of manufacturing a magnetic recording medium, comprising the steps of:
   mechanically pulverizing and mixing an essentially dry composition containing a magnetic powder consisting of hexagonal ferrite and a solid resin with a dispersion mixer to prepare an essentially dry mixed powder;
   transferring said essentially dry mixed powder to a dispersing apparatus to dissolve and disperse said essentially dry mixed powder in a solvent, thereby preparing a magnetic paint; and
   applying the magnetic paint on a base to form a magnetic recording layer.

2. A method according to claim 1, wherein the magnetic powder is surface-treated with a titanium-coupling agent.

3. A method according to claim 1, wherein the hexagonal ferrite has a general formula MO.n $(Fe_2O_3)$ (wherein M is an element selected from the group consisting of barium, strontium, lead and carbon; n is a number between 5 and 6; and part of the Fe is substituted with an element selected from the group consisting of titanium, cobalt, zinc, indium, manganese, copper, germanium, an niobium.).

4. A method according to claim 1, wherein the composition contains 100 parts by weight of the magnetic powder and 5 to 200 parts by weight of the binder.

5. A method according to claim 1, further comprising the step of forming the mixed powder to form a formed body.

* * * * *